H. J. M. HOWARD.
HOSE RACK.
APPLICATION FILED JUNE 3, 1911.
1,018,764.
Patented Feb. 27, 1912.
2 SHEETS—SHEET 2.
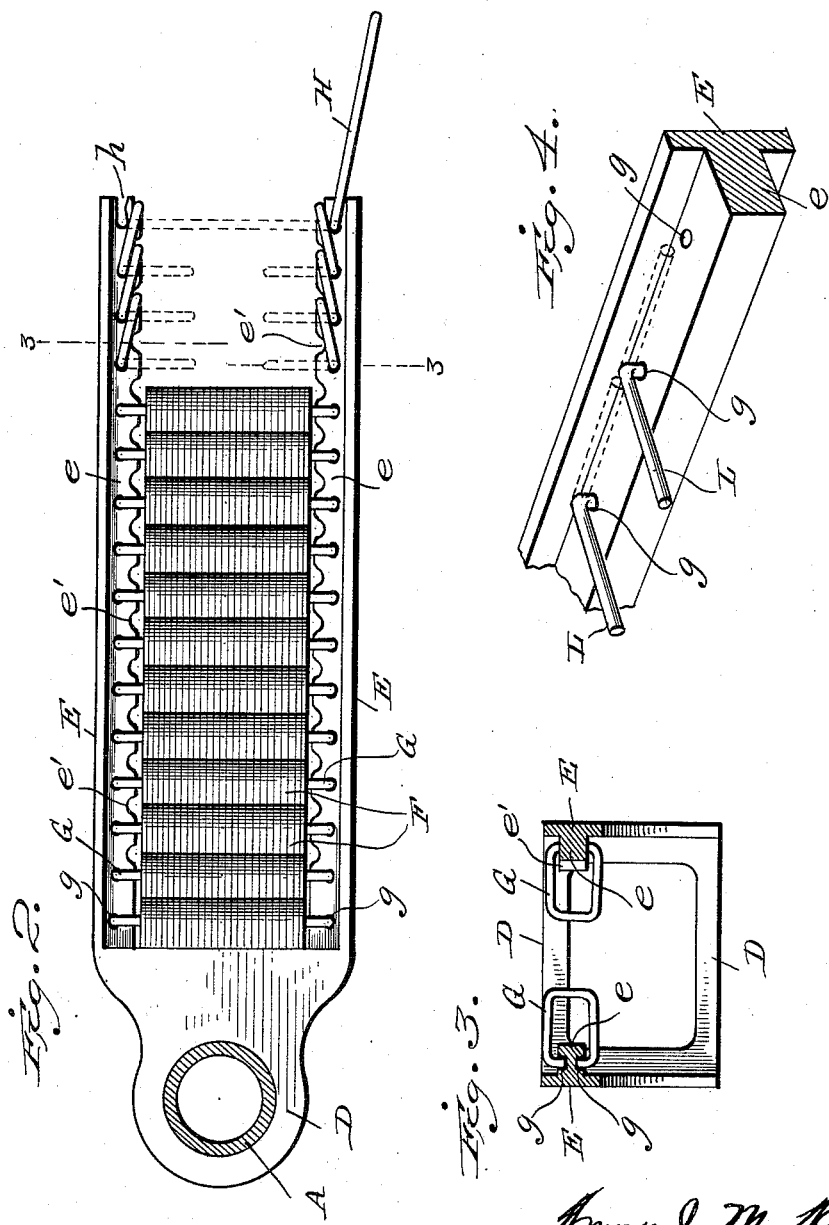

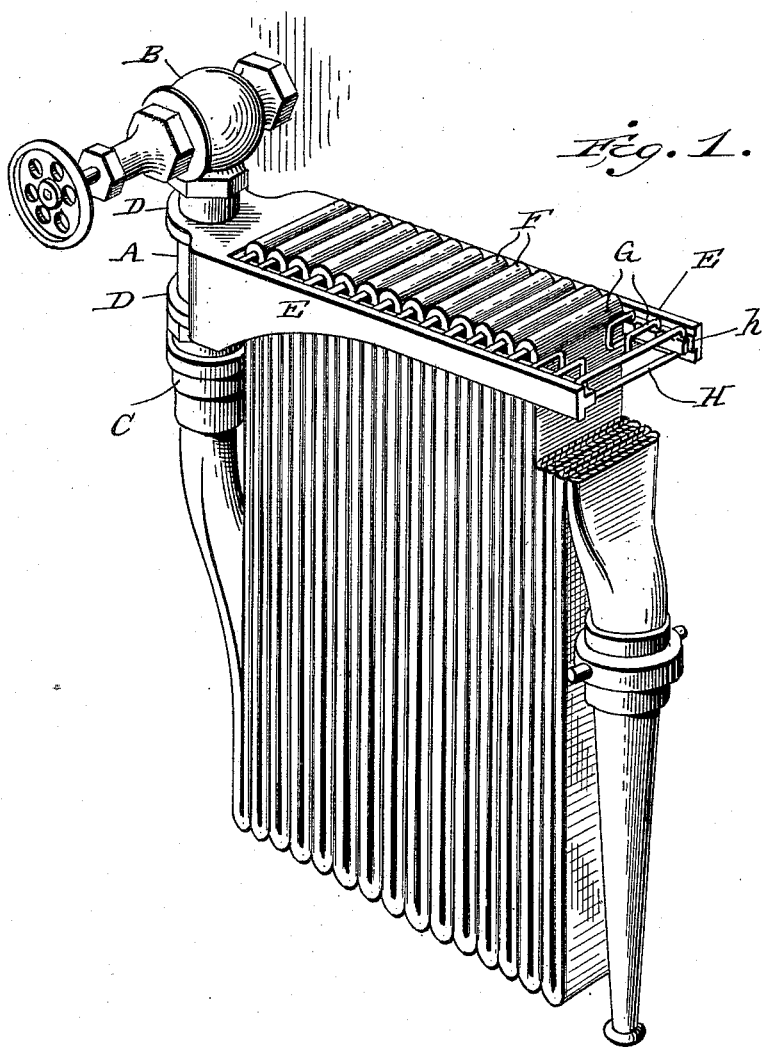

UNITED STATES PATENT OFFICE.

HENRY J. M. HOWARD, OF WASHINGTON, DISTRICT OF COLUMBIA.

HOSE-RACK.

1,018,764.  Specification of Letters Patent.  Patented Feb. 27, 1912.

Application filed June 3, 1911. Serial No. 631,083.

*To all whom it may concern:*

Be it known that I, HENRY J. M. HOWARD, a citizen of the United States, residing at Washington, in the District of Columbia, have invented certain new and useful Improvements in Hose-Racks; and I do hereby declare the following to be a full, clear, and exact description of the same, reference being had to the accompanying drawings, forming part of this specification, and to the figures and letters of reference marked thereon.

This invention relates to hose racks of that type designed primarily for storing or holding fire hose in such manner that one end of the hose may be attached to the water supply pipe and the opposite or nozzle end left free so that it may be grasped and the hose drawn from the rack in condition for instant use.

Objects of the invention are to provide an ornamental and attractive structure which will effectually support the hose in pendent loops by supporting means which are permanently but movably connected with the carrying or rack arms and which, when turned to release the hose, will be arrested substantially parallel with but outside of the path of the hose thereby leaving an unobstructed space for the free movement of the hose in either being placed on or removed from the rack.

The invention consists in certain novel details of construction and combinations and arrangements of parts all as will be hereinafter described and pointed out particularly in the appended claims.

Referring to the accompanying drawings,—Figure 1 is a perspective view of a hose rack embodying the present invention, a portion of the hose supported by the rack being broken away to show the loop supporting arms; Fig. 2 is a plan view of the rack with some of the loops of hose drawn off; Fig. 3 is a detail section in a plane transversely of one of the rack arms; Fig. 4 is a perspective view showing a short section of one arm with a modified form of pivoted hose loop support.

Like letters of reference in the several figures indicate the same parts.

The rack of the present invention is adapted for pivotal support on a wall plate, pipe clamp bracket or valve nipple in a manner similar to hose racks now in common use. As shown in the drawings, it is pivotally supported on a valve nipple A extending down from a valve B and adapted for the attachment of the supply end of the hose by means of the usual coupling C. Conveniently, the body of the rack is provided with large eyes D at top and bottom to form widely spaced bearings on the nipple and forwardly extending parallel arms E between which the upper ends of the loops F of the hose are supported. Said arms are preferably T-shaped in cross section, as shown in Fig. 3, with the central web $e$ projecting inwardly, and in use arranged in substantially horizontal position.

In the preferred construction, the webs $e$ of the arms are provided in their top and bottom faces with a series of bearings $g$ in which the opposite ends of bail-like pivoted supports G seat. Said pivoted supports are preferably substantially rectangular and extend around the inner edge of the web $e$. They may be comparatively short and are arranged a distance apart, governed in some measure by the character of the hose to be used. For use with linen hose which folds closely they may be close together, while for rubber lined hose they should be somewhat widely spaced, although with heavy hose in a rack having closely spaced loop supports, alternate supports may be used for each loop of hose.

In order to have a perfectly free passage for the hose as it is being placed in position or drawn off, as well as to afford the maximum width of opening for the hose, each of the webs $e$ is recessed in its inner edge, as at $e'$ for the reception of the ends of the supports G when turned forwardly. The supports are thereby entirely removed from the path of the hose and as they cannot rotate beyond the proper point owing to their contact with the stop faces formed by the walls of the recesses they cannot turn to a position where they interfere with each other. The liability of the supports becoming jammed, is by the construction described entirely overcome.

To prevent the accidental escape of the outer loop of hose and preferably to require a decided pull to release the same, a guard or lock arm H, preferably corresponding in general form to the supports G, is pivoted in the end of one rack arm and extends across to the opposite rack arm, where it may be frictionally held as by entering a slot or recess $h$, usually inclined slightly so as to require a slight deflection or springing together of the arms for the guard to enter or escape. The guard arm forms in effect a friction latch and it may have a name plate attached to or forming a part of it, or it may support the outer loop of hose, the former arrangement being preferred as it gives a more finished appearance.

In some instances, and particularly when widely spaced supports are employed, the supports for the loops of hose may be of the form shown in Fig. 4, i. e., a single arm L located above the plane of the web e and having its shank extended down through the web to form the pivot. With this construction the arms of the supports should be of no greater length than the spaces between adjacent supports, so that they may turn out of the path of the hose, but they are stopped in their movement by striking the upwardly extending web of the rack arm, whereby danger of interfering with each other and causing a jamb is practically eliminated. In this instance the vertical webs of the rack arms form the stop surfaces for limiting the movements of the supports. In both constructions the supports turn forwardly into recesses out of the path of the hose and do not interfere with the hose in either being applied or removed from the rack.

The bail-like form of pivotal support is preferred because of its strength and the ease with which the structure may be made and assembled. Each support has in effect widely spaced top and bottom bars, having their pivotal bearings at widely spaced points, i. e., in the top and bottom of the rack arm. Even when the supports are made of relatively light wire they are amply strong to support the heaviest hose and to withstand any strains to which they may be subjected in the usual use of the apparatus.

The pivotal supports G, it will be noted, are short as compared with the space between the supporting arms and consequently when the supports swing forwardly in releasing the loops of hose, the loops are not spread materially by the lever action of the supports. This construction not only permits the hose to free itself more readily and quickly but saves the hose from strain and wear by the supports. The end support H instead of being short, as just described, is made long, and owing to its action in requiring the loop of hose to spread widely in order to be released, it will serve as an effectual lock or retainer, although the friction catch is preferably employed as an additional precaution.

When the supports are swung to their open positions it will be noted that the inner faces of the arms form guiding surfaces for the loops of hose; in other words, the inner faces of the arms are in vertical planes between the oppositely disposed pivotal supports when the latter are in their open positions.

Having thus described my invention, what I claim as new and desire to secure by Letters Patent of the United States, is:

1. A horse rack comprising a pair of horizontal parallel rack arms free at their outer ends and between which loops of hose are adapted to be suspended, a series of pairs of oppositely arranged supports pivotally mounted on the arms to swing in the same horizontal plane and having a range of pivotal movement outwardly past the inner faces of the arms, whereby the inner faces of the arms form guiding surfaces for the loops of hose and stop surfaces on the rack arms for arresting the outwardly pivotal movement of the supports.

2. A hose rack comprising a pair of parallel rack arms between which loops of hose are suspended, each of said arms having its inner face recessed, and a series of pairs of oppositely arranged supports pivotally mounted on the arms in the same plane to project toward each other, said supports being movable outwardly into said recesses and past the vertical planes of the inner faces of the arms when turned to release or admit a loop of hose whereby an unobstructed hose passage is left between the arms and the inner faces of the arms form guides for the loops of hose.

3. A hose rack comprising a pair of parallel rack arms between which loops of hose are suspended, each of said arms having its inner face provided with a series of recesses, and a series of pairs of oppositely arranged bail-like supports embracing and pivotally mounted on the arms to project toward each other and movable into and out of said recesses.

4. A hose rack comprising a pair of parallel rack arms between which loops of hose are suspended, each of said arms having its inner face provided with a series of recesses and its top and bottom faces provided with a series of bearings, and a series of pairs of bail-like supports having their ends pivotally mounted in said bearings and their intermediate portions movable into and out of said recesses, each pair of supports being adapted to project toward each other and form a support for a single loop of hose.

5. A hose rack embodying a pair of parallel rack arms of substantially T-shape in cross section and with the central web provided with a series of vertical edge recesses, and a series of pairs of oppositely arranged bail-like hose supports embracing and pivotally mounted on said central web and movable into and out of said recesses, whereby an unobstructed hose space may be left between the arms.

6. A hose rack embodying a pair of parallel rack arms of substantially T-shape in cross section, and a series of pairs of oppositely arranged hose supports pivotally mounted on the central webs of the arms and movable outwardly past the vertical plane of the inner faces of said webs, whereby said faces form the guides for the loops of hose.

7. A hose rack embodying a pair of parallel rack arms free and unconnected at their outer ends, a series of short supports pivotally mounted on each arm to swing in the same horizontal plane, said supports being arranged in pairs projecting toward each other with a wide space between their proximate ends, whereby the loops of hose may be withdrawn without material distention, and a long support at the outer end of the rack pivotally supported to swing in only a horizontal plane for supporting the end loop whereby the end support will form a retainer to prevent the withdrawal of the hose until said end loop is opened to permit the support to turn to one side.

HENRY J. M. HOWARD.

Witnesses:
THOMAS DURANT,
ALEXANDER S. STEWART.

Copies of this patent may be obtained for five cents each, by addressing the "Commissioner of Patents, Washington, D. C."